(Model.)
C. H. CARTER.
KNITTING MACHINE.
No. 309,691. 5 Sheets—Sheet 1. Patented Dec. 23, 1884.
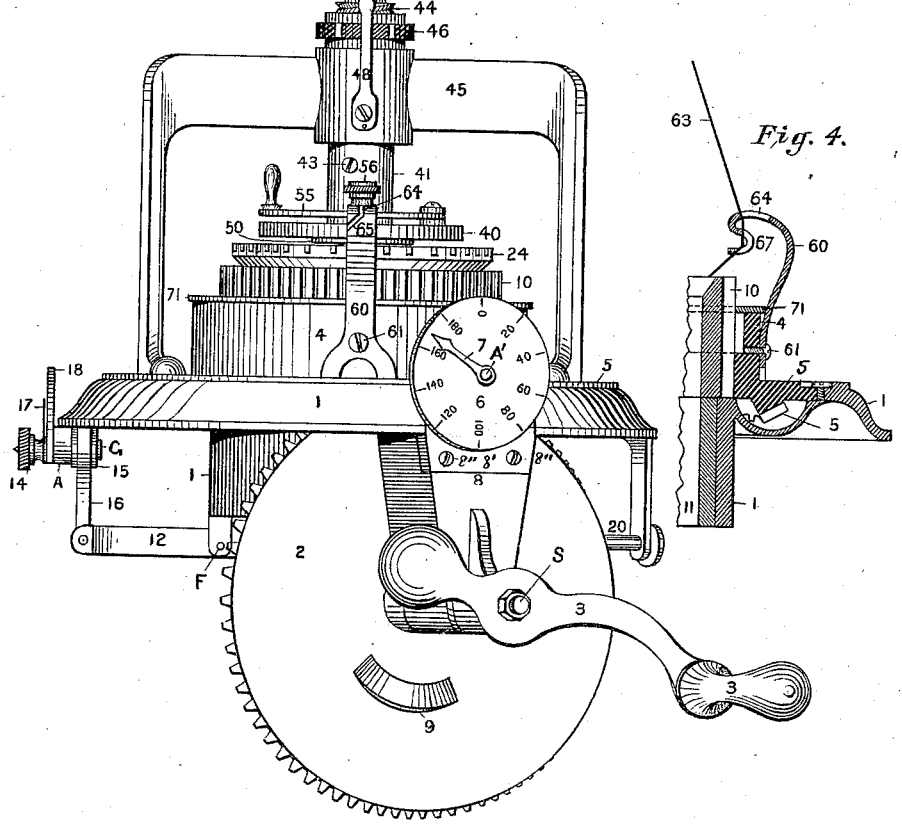
Fig. 1.
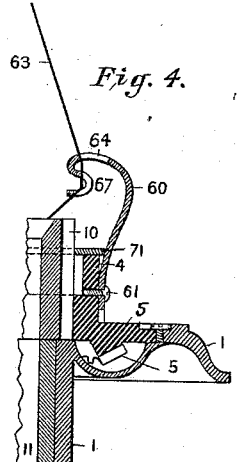
Fig. 4.
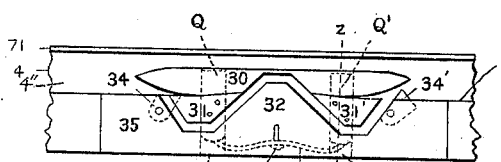
Fig. 5.
Fig. 6.
Witnesses:
John Grist
R. P. King
Inventor:
C. H. Carter
By Henry Grist
Att'y (Model.)

C. H. CARTER.
KNITTING MACHINE.

No. 309,691.

5 Sheets—Sheet 2.

Patented Dec. 23, 1884.

Witnesses:
John Grist
R. P. King

Inventor:
C. H. Carter
By Henry Grist
Att'y (Model.)

C. H. CARTER.
KNITTING MACHINE.

No. 309,691. Patented Dec. 23, 1884.

Witnesses:
John Grist
R. P. King

Inventor
C. H. Carter
By Henry Grist
Att'y.

(Model.)
C. H. CARTER.
KNITTING MACHINE.
No. 309,691. Patented Dec. 23, 1884.
5 Sheets—Sheet 4.
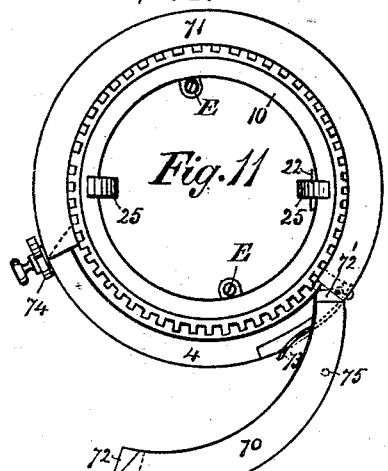
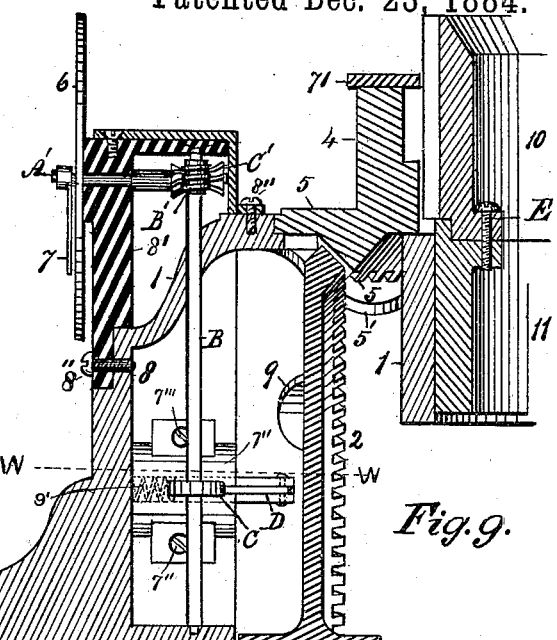
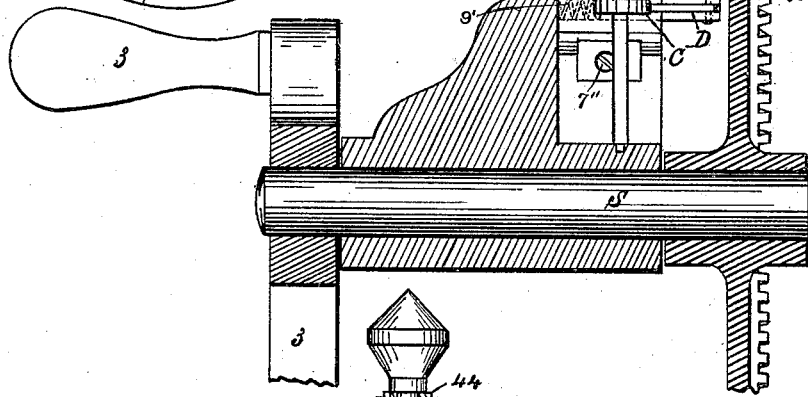
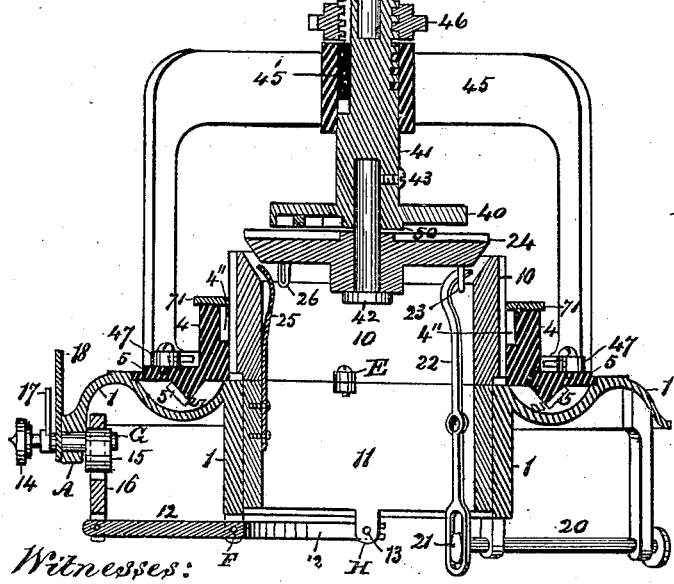
Witnesses:
John Grist
R. P. King
Inventor:
C. H. Carter
By Henry Grist
Att'y (Model.)
C. H. CARTER.
KNITTING MACHINE.
No. 309,691.
5 Sheets—Sheet 5
Patented Dec. 23, 1884.
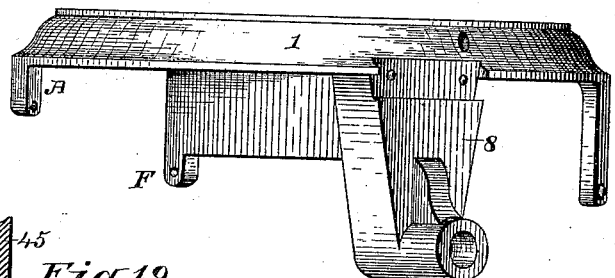
Fig. 12.
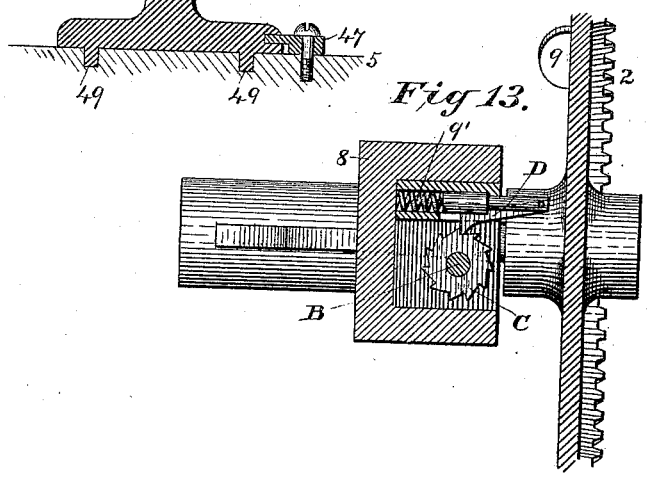
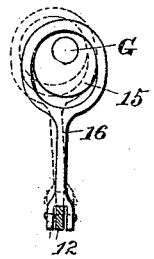
Fig. 17.
Fig. 19.
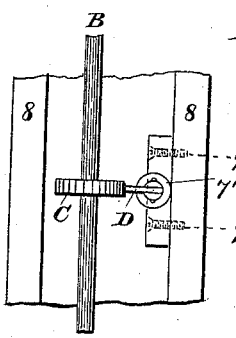
Fig. 14. Fig. 16.
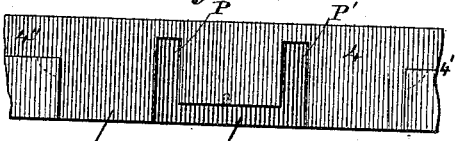
Fig. 15. Fig. 18.
Witnesses:
John Grist
R. P. King
Inventor:
C. H. Carter
By Henry Grist
Atty.

United States Patent Office.

CHARLES HENRY CARTER, OF COLBORNE, ASSIGNOR TO PATRICK GEORGE CLOSE, OF TORONTO, ONTARIO, CANADA.

KNITTING-MACHINE.

SPECIFICATION forming part of Letters Patent No. 309,691, dated December 23, 1884.

Application filed January 18, 1883. (Model.)

*To all whom it may concern:*

Be it known that I, CHARLES HENRY CARTER, of Colborne, in the county of Northumberland, in the Province of Ontario, in the Dominion of Canada, have invented certain new and useful Improvements in Knitting-Machines; and I do hereby declare that the following is a full, clear, and exact description of the same.

Figure 2:
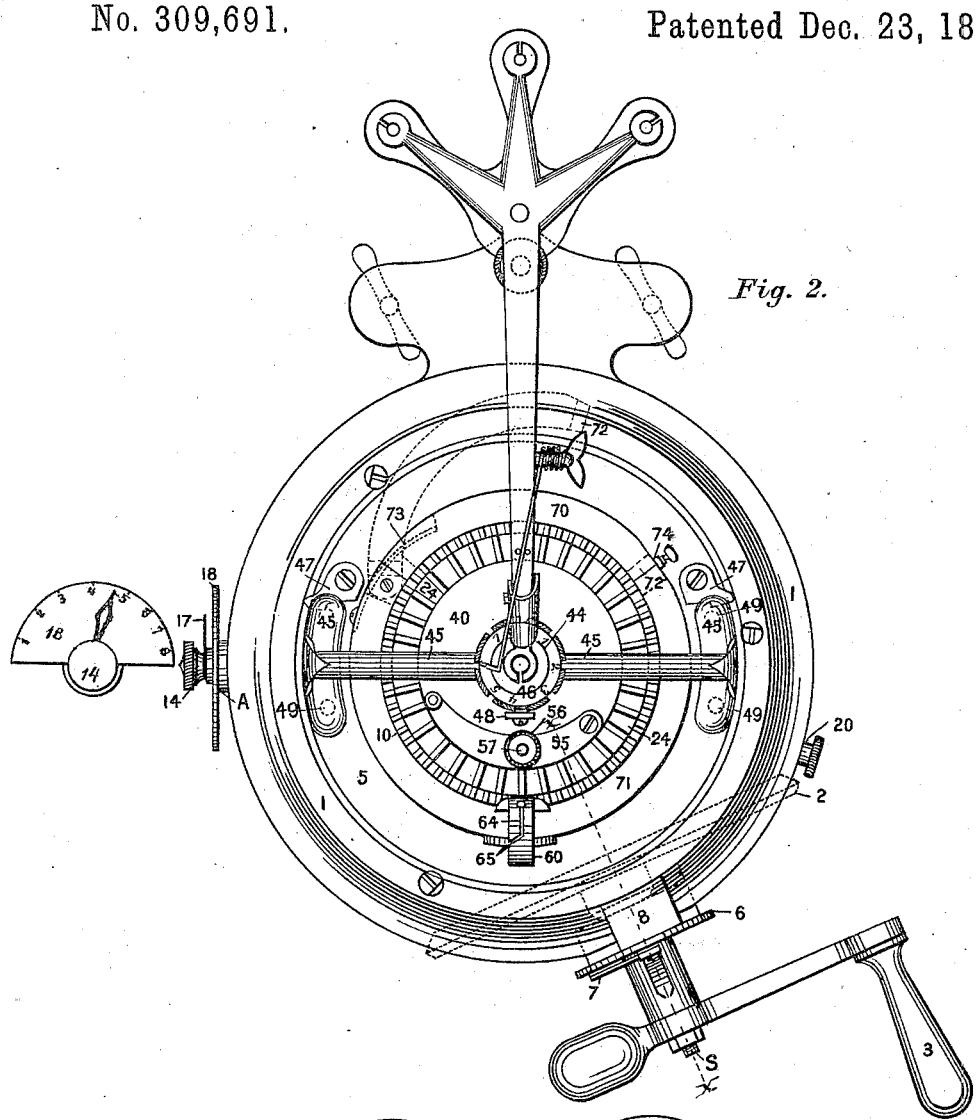
Figure 7:
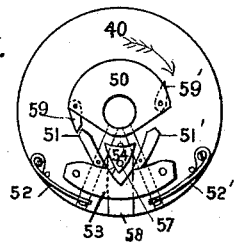
Figure 8:
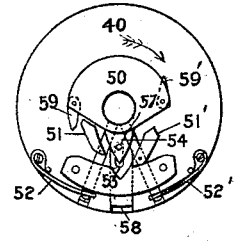
Figure 3:
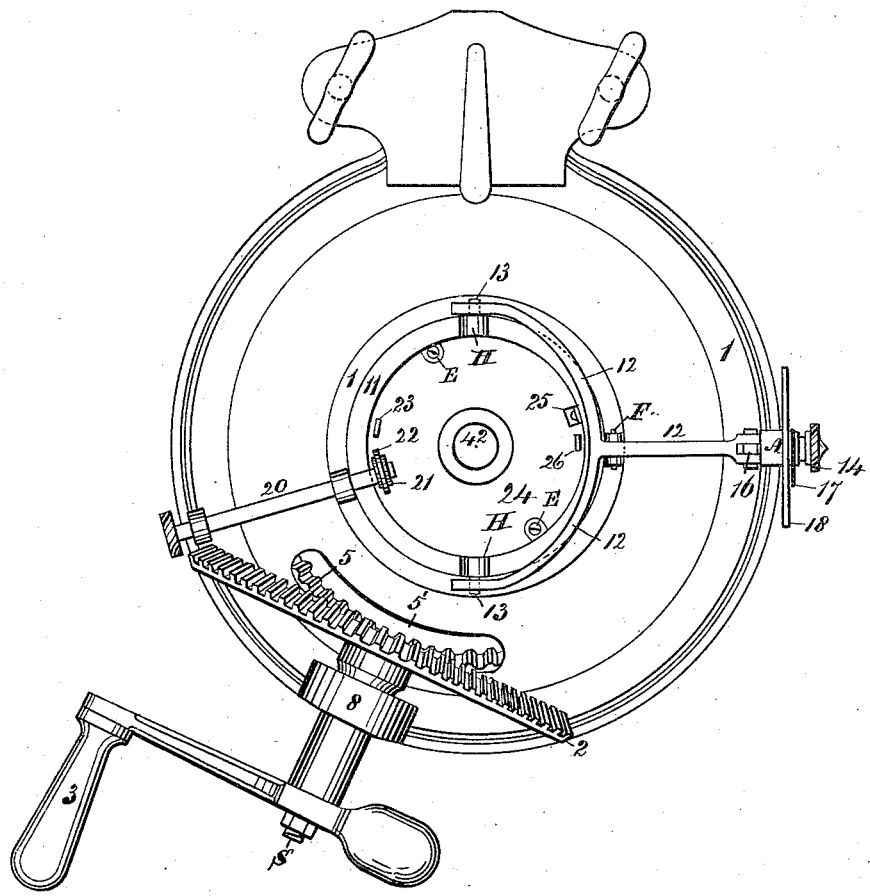

Figure 1 is an elevation of my improved knitting-machine. Fig. 2 is a top view. Fig. 3 is a view of the machine inverted. Fig. 4 is a sectional view, vertically, of the feed-guide and a portion of the needle and cam cylinders and bed of the machine. Fig. 5 is an elevation of part of the cam-cylinder, showing the spring-cams in a normal position. Fig. 6 is a like view showing a spring-cam retracted by the entrance of the needles. Fig. 7 is a plan of the ribbing-cam holder inverted, showing the position of the cams when at rest. Fig. 8 is a like view of the same, showing a cam retracted by the needles when at work. Fig. 9 is an enlarged vertical section of Fig. 2 on the line $x\ x$, showing the mechanism for registering the number of rows of stitches. Fig. 10 is a vertical section of Fig. 1. Fig. 11 is a view of the top of the needle-cylinder, ring on cam-cylinder, and gate therein opened. Fig. 12 is an elevation of the bed of the machine and parts integrally cast therewith in one piece. Fig. 13 is a section on line $w\ w$, Fig. 9. Fig. 14 is a view of a portion of interior of boxing from the rear, showing in elevation the push-pawl and ratchet on shaft operating the mechanism seen in Fig. 9 for recording the number of rows of stitches. Fig. 15 is an elevation of a portion of the cam-cylinder, showing the recesses therein, the cams being removed. Fig. 16 is a section on the line $z\ z$, Fig. 5. Fig. 17 is an end elevation of the eccentric and connecting-levers operating the needle-cylinder vertically. Fig. 18 is an elevation of the spring-catch or cam-cylinder for fastening the gate in the ring on top of said cylinder. Fig. 19 is a section of one foot of the yoke, showing its fastening-connection to the flange of cam-cylinder.

1 is the circular bed of the machine, and 8 a boxing integrally cast on the under side, to carry a shaft, S, on which is keyed a driving cog-wheel, 2, which meshes with cogs on the under side of flange 5 of cam-cylinder 4, which revolves around needle-cylinder 10 by operating handle 3.

6 is a dial-plate secured to casing 8', which is fastened to the top of bed 1 and to boxing 8 by screws 8'', and over the face of the dial-plate moves a pointer, 7, on a shaft, A', having a worm-gear, C', in engagement with a worm, B', on a shaft, B, which has near the lower end a ratchet-wheel, C, which is moved intermittently by a spring push-pawl, D, sliding in a bearing, 7'', secured by screws 7'''' to boxing 8, and projecting to be forced inward by contact with cam 9 on wheel 2, and reacted by coiled spring 9' at one end of tubular bearing 7'', whereby the pointer will be moved one degree of the dial-plate at each revolution of the cam cylinder and wheel 2, both having a corresponding number of cogs to register the number of courses of stitches, so as to govern the making up of a stocking or other goods.

10 is the needle-cylinder, the blanks between the grooves bearing over bed 1, and is secured by lugs and bolts E to a lower cylinder, 11, for convenient separation. Both cylinders conjointly have a vertical movement only to make a longer or shorter stitch, and which movement is effected by a forked lever, 12, fulcrumed at F to bed 1. The ends of the forks are slotted, and receive trunnions 13, fixed in lugs H, cast on cylinder 11. The outer end of lever 12 is pivoted to one end of a vertical arm, 16, the other end having a ring to hang on a disk, 15, eccentrically fixed on a shaft, G, passing through a lug, A, cast on bed 1, and to the lug is secured a dial-plate, 18, over which moves a pointer, 17, keyed on shaft G, which is provided with a thumb-piece, 14, so that by turning the thumb-piece, or by moving the pointer, shaft G and eccentric 15 are rocked, thereby moving arm 16 endwise to tilt lever 12, whereby the needle-cylinder 10 is moved vertically and the rise and fall shown by the pointer and indicated by degrees on the dial-plate. The adjustment of the cylinder vertically causes the needles therein to make either a longer or shorter or a more open or a closer stitch, to widen and narrow the work while knitting by making a coarser or finer stitch, as may be desired.

20 is a radial shaft journaled in hangers on the under side of bed 1, and is provided with a thumb-piece at the outer end, and a cam, 21, at the inner end, to work in a slot near the end of a vertical lever, 22, which is centrally pivoted to the inside of cylinder 11. The upper end of the lever engages with a stop-lug, 23, on the under side of ribbing-dial 24, so that by turning the thumb-piece, the upper end of the lever 22 is brought into contact with lug 23, and thereby the ribbing-dial will be slightly rotated for the purpose of adjusting the dial to bring the radial grooves therein to intervene the grooves in needle-cylinder 10, to allow of insertion and withdrawal of the needles in the ribbing-dial for the employment of a greater or less number of needles to suit the enlargement and contraction of the work. This movement of the ribbing-dial is preferable to moving the needle-cylinder to intervene its grooves with those of the ribbing-dial, because a slight movement of the needle-cylinder cannot be effected so readily and gently by handle 3.

25 is a stop on the inside of cylinder 10, and 26 a lug on the under side of the ribbing-dial 24, to limit the reciprocation of the reverse movement of the ribbing-dial in knitting a flat web, which is produced when the handle 3 is rocked to reciprocate cam-cylinder 4.

Figs. 5 and 6 show the cams in cam-cylinder 4, for operating the needles in cylinder 10 to retain the stitch on the latch until the needles come opposite to the feed, and thereby prevent dropping of the stitches. The cam-cylinder 4 is recessed or rabbeted to a suitable depth and distance from its upper edge to suit the butts and length of the needles, thereby forming an annular bearing, 4', for the needles. Within the recess is a fixed cam, 30, having pointed ends to deflect the butts of the needles to the cams, hereinafter described, and a three-sided notch in the lower edge of the middle to form a portion of the needle-heel path. A portion of the face of the cylinder 4 is cut out flush with the annular recess, thus making a gap, 5', as shown in Fig. 15, and into said gap, and fixed flush therewith, is fitted a plate, 35, having at the middle a three-faced cam, 32, formed by cutting away and notching the plate. The summit of said cam 32 enters the three-sided notch in cam 30, but leaves intermediately a path for the passage of the heels of the needles. The notched-out portion of plate 35 on both sides of the cam 32 thus forms two recesses having three sides, in which are respectively cams 31 31', corresponding in shape to the form of the recess, but smaller in area. These cams are respectively bolted to slides Q Q' in grooves or channels P P', sunk in the gap portion of cylinder 4, as shown in Fig. 15, and the outer or lower end of said slides bears against a doubly-ended spring, 33, secured in a sunken channel, P'', connecting the channels P P' by a screw, 33'', whereby cams 31 31' will be forced upward by the spring against the lower edge of cam 30, as shown in Fig. 5. The cylinder at the upper or inner corners of the sunken gap 5' is diagonally slotted flush with the sunken face to the depth shown by dotted lines in Fig. 15, and in the slots are respectively pivoted swing-cams 34 34' at the entrance and exit of the path of the heels of the needles between the cams. The object of these swing-cams is to prevent the needles from falling down the channel or track between the cams 35 and 31 before being struck by cam 30 and depress cam 31, thus closing the aforesaid channel or track, the needles then passing between cams 30 and 31 on the same level as the annular bearing 4' until cam 32 strikes, which then raises the needles until the latch clears the loop, the needles being then in proper position for taking the yarn on top of cam 32. The needles are then drawn downwardly by the inclined sides of cams 30 31' and close the latch, at the same time drawing the needle through the loop, after which they are pressed upward by the cam-face of cam-plate 35, thereby causing the loop to open the latch and keep it open while the bearing 4' of the cam-cylinder 4 is moving under the heels of the needles, when the operation of making the stitch is repeated by contact with cam 30, as heretofore described. The continued operation of cylinder 4 in one direction will knit a circular web; but when the cylinder is reciprocated axially by the swinging movement of handle 3 the swing-cams 34 34' will be alternately moved at each change of motion and the cams 31 31' operated alternately to knit a flat web.

The ribbing-cam holder 40 has a stem, 41, and is connected to the ribbing-dial 24 by a headed bolt, 42, passing upwardly through the center of the ribbing-dial into a bore in stem 41, and secured therein by a binding-screw, 43. The upper end of the stem passes through the middle of a yoke, 45, the end of the stem cut with a screw, 44, on which is a nut, 46, bearing on the top of the yoke, so that by turning the nut the ribbing-dial and cam-holder will be raised or lowered to make either a longer or shorter stitch, as may be desired. The stem of cam-holder 40 is provided with a longitudinal groove, in which is a key, 45', secured to yoke 45, to allow stem 41 to slide vertically in the yoke for adjustment of the ribbing-dial by the nut to the desired height, and to cause the yoke to rotate the cam-holder 40 and bolt 42, the ribbing-dial 24 remaining stationary. The rotation of yoke 45 is effected by cam-cylinder 4, to which it is removably attached for disconnection when ribbing is not desired, by providing the feet of the yoke with dowel-pins 49, fitting into holes in flange 5 of cylinder 4, and held down by buttons 47, pivoted to the top of flange 5, and turning into notches in the feet of the yoke.

48 is a spring locking-bar attached to the yoke, to engage with notches in the edge of nut 46, to prevent the nut turning after the adjustment of the ribbing-dial to the required height has been effected to make the desired length of stitch, and said notches are numbered to correspond with the degrees on dial-plate 18, whereby the needle-cylinder 10 and ribbing-dial 24 can be relatively adjusted to cause the ribbing and dial needles to make stitches of equal length. The ribbing-cam holder 40 has on the under side a central fixed cam, 50, provided with recesses, in which are pivoted swing-cams 59 59', to close against cams 51 51', secured to slides in grooves. (Shown by full and dotted lines.) Cam 59 prevents the needles entering between cams 50 and 51 when the cam-holder is rotating in the direction of the arrows, and cam 59' prevents the needles entering between cams 51' and 50 when the cam-holder is rotating in the reverse direction.

52 52' are springs, one end secured to the cam-holder and the other end bearing against an upturned end of the slides to which the cams 51 51' are secured, so that after the cams 51 51' have been forced inward by the needles they are retracted by the outward tension of the springs.

53 is a fixed cam having a central notch coinciding with the inner face of cams 51 51'.

54 is a cam fixed to a slide, 58, in a groove in the cam-holder, and which slide is connected to the end of a rod, 57, passing through a radial slot in the cam-holder and through a hole in lever 55, pivoted to the top of the cam-holder. The upper end of the rod is screw-threaded and provided with a thumb-nut, 56, so that by moving the lever, cam 54 may be either set forward or retracted, as desired, and fixed by screwing down the nut. By the inward adjustment of cam 54 the needle-heel path will be set back, so that the needles will not work with those in cylinder 10 when knitting either a plain flat or a tubular web, and when cam 54 is set forward the needles in ribbing-dial 24 will work with the needles in cylinder 10 to make either a ribbed flat or a tubular web.

When cam-holder 40 is rotated in the direction shown by the arrows, the ribbing-dial remains stationary, and the needles therein, by the rotation of the cam-holder, close cam 59 against cam 51 to prevent the needles passing between cams 50 and 51. Cam 51, by contact with the needles, will then be retracted to the position shown in Fig. 8, to open the passage between cams 51, 53, and 54. Cams 51 and 54 then force the needles outward, thereby causing the loop thereon to open the latch of the needles and take the stitch from the needles in cylinder 10 in the ordinary manner. After passing the notch in cam 53 the needles are receded by passing between cams 54 and 51', thereby causing the loop on the needles to close the latch after taking the stitch from the needles in cylinder 10 and complete the stitch as in other machines. The needles then remain stationary until again acted on by contact of cam 51. The cams have a reverse operation when the cam-holder is rotated in the direction contrary to that indicated by the arrows, to allow of a reciprocating movement of cylinder 4 to make a flat ribbed web. A welt on the top on a stock or at the commencement of other goods is made by adjusting cam 54 by lever 55 to set back the needle-heel path in cam-holder 40, whereby the needles in ribbing-dial 24 will be kept back out of work with the cylinder-needles. Two rows of stitches are then knit by the cylinder-needles by two revolutions of cam-cylinder 4, and afterward cam 54 is moved to its former position to again bring forward the retracted needle path in cam-holder 40, whereby the needles in ribbing-dial 24 will take up the two rows of stitches previously made by the cylinder-needles and combinedly make a welt on the top.

60 is the feed-guide, secured to cam-cylinder 4 by screw 61. The top rises higher than the needles, and is bent downwardly S-shaped.

65 is a diagonal slot from the side of the guide to a longitudinal slot, 64, in the upper bend, and 67 a longitudinal slot in the lower curve. The yarn 63 is entered through the diagonal slot, feeds through the upper slot, and is taken by the needles from the lower slot. The height of the guide keeps the yarn out of contact with the needles, and the two longitudinal slots 64 and 67 prevent escape of the yarn when cylinder 4 is reciprocated.

70 is a gate forming a portion of a flat ring, 71, secured to the top of cam-cylinder 4. One end of the gate is pivoted to the top of cam-cylinder 4, and the gate, when open, gives access to the needles in cylinder 10 and allows them to be transferred to ribbing-dial 24 without removing the stitch from the needles. The gate portion of the ring is slotted flatwise from both ends, and the ends of the opening in the ring slotted to correspond therewith. In the slots either of the ring or the gate are inserted flat steel plates, 72 72', projecting sufficiently to form tongues, which, when the gate is closed, enter the opposite slot of the gate or ring, the tongues thus breaking joint with the joints at both ends of the gate when closed. The plates or tongues on the inside face conform to the circle of the ring, and present a smooth surface flush with the inside of the ring. The plates protect the joints of the gate at both ends from wear by friction of the needles, and unless so protected the needles, by pounding in the joints, would make a V-neck therein and cause the needles to work imperfectly.

73 is a flat spring, one end secured to cylinder 4, the other end free and projecting over a recess sunk in the outside face of the cylinder, immediately below that end of the gate which is pivoted to the top of the cylinder. The gate is provided with a downward-projecting pin, 75, which, when the gate is closed, forces the free end of the spring into the recess.

74 is a spring-catch pivoted to cylinder 4, to engage with the other end of the gate when closed, and be forced back by the closing of the gate, so that by pressing back the catch with one hand the gate will automatically open by reaction of spring 73, and when the gate is closed again the catch will be forced back by contact of the gate, and the catch, reacting, lock it. Thus the gate can be either opened or closed and fastened by one hand.

I claim as my invention—

1. The combination, with bed 1, having boxes 8, shaft S, driving-wheel 2, provided with cam 9, cam-cylinder 4, having cog-flange 5, and casing 8', having dial-plate 6, of the push-pawl D, ratchet-wheel C, shaft B, gear C', and worm B' and shaft A', provided with pointer 7, whereby the number of rotations of the cam-cylinder, and consequently courses of stitches, are registered, substantially as set forth.

2. The combination, with bed 1, needle-cylinder 10 11, and ribbing-dial 24, having stop 23, of shaft 20, having cam 21, and vertical lever 22, having a cam-slot to rotatively adjust the ribbing-dial so that the grooves therein will intervene the grooves in the needle-cylinder, for the purpose set forth.

3. The combination, with yoke 45, of the ribbing-dial 24, bolt 42, screw 43, ribbing-cam holder 40, having tubular stem 41, provided with screw-thread 44, notched nut 46, and locking-bar 48, whereby the ribbing-dial may be raised and lowered to make a longer or shorter stitch, substantially as set forth.

4. The combination, with the bed A, having dial-plate 18 and cylinder 10 11, lever 12, arm 16, and shaft G, provided with a pointer, 17, of the ribbing-dial 24, bolt 42, cam-holder 40, having stem 41, screw-nut 46, and yoke 45, whereby a relative adjustment of the nut and pointer will equalize the length of stitch of the ribbing and cylinder needles to produce uniformly-sized stitches when enlarging and contracting ribbed work, substantially as described.

5. The combination, with the ribbing-cam holder 40, of cam 50, swing-cams 59 59', sliding cams 51 51', springs 52 52', cam 53, and adjustable cam 54, whereby the said cams operate the ribbing-needles to knit a flat ribbed web by a reciprocating rotary movement of the ribbing-cam holder and cam-cylinder, as set forth.

6. The combination, with the cylinder-needles and their cylinder and cam-cylinder 4, having grooves P P', of the fixed cams 30, sliding cams 31 31', spring 33, and swing-cams 34 34', to prevent the needles dropping the stitch, substantially as set forth.

7. The combination, with ribbing-cam holder 40, having grooves therein, of the fixed cams 50 53, swing-cams 59 59', sliding cams 51 51', springs 52 52', adjustable cam 54, and nut 56, to throw the ribbing-needles in and out of work with the cylinder-needles when making a welt top, as set forth.

8. In combination with cam-cylinder 4, the feed-guide 60, S-shaped at top, and having diagonal slot 65 at the side and longitudinal slots 64 and 67 through the upper bend and lower curve, respectively, to prevent escape of the yarn while knitting.

9. The combination, with cylinder 4, having a flat ring, 71, containing a gate, 70, provided with pin 75, the spring 73, and spring-catch 74, operating as set forth, whereby the gate may be unlocked and opened and closed and locked by one hand, as set forth.

CHARLES HENRY CARTER.

Witnesses:
 HENRY GRIST,
 JOHN GRIST.